Nov. 13, 1956    H. E. BOWERMAN    2,770,012
APPARATUS FOR AND METHOD OF MOLDING RUBBER ARTICLES
Filed Jan. 5, 1953    8 Sheets-Sheet 6

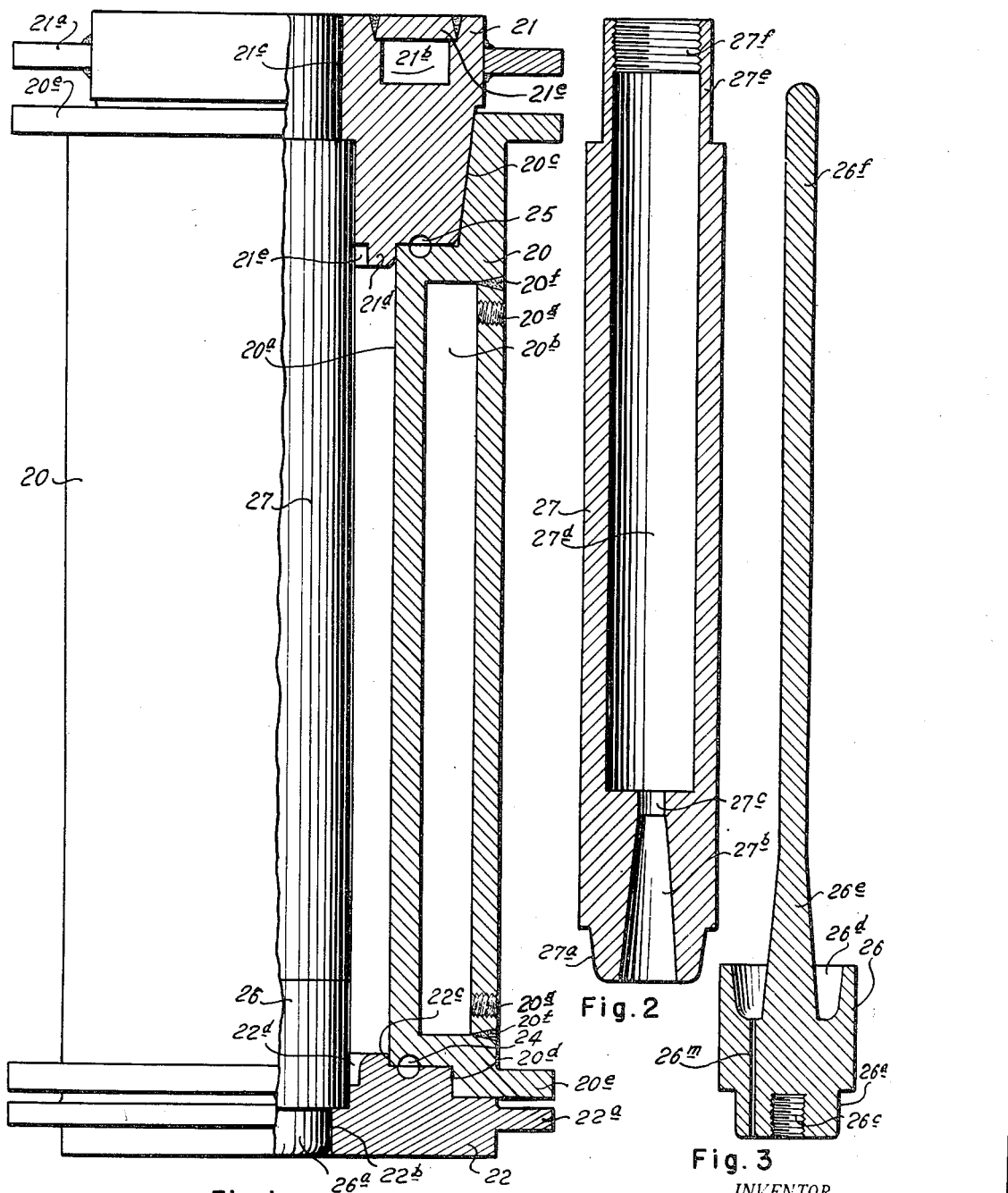

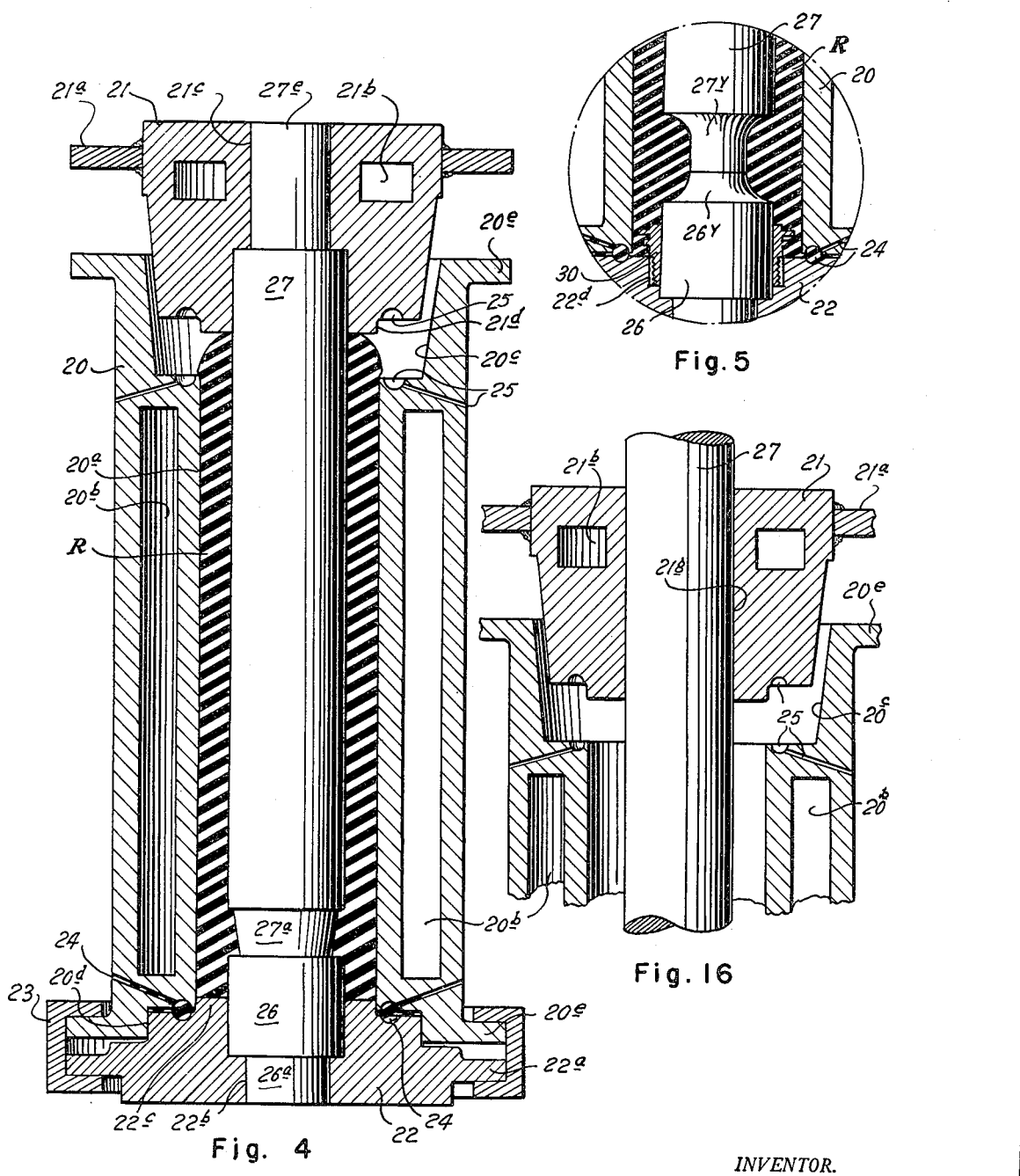

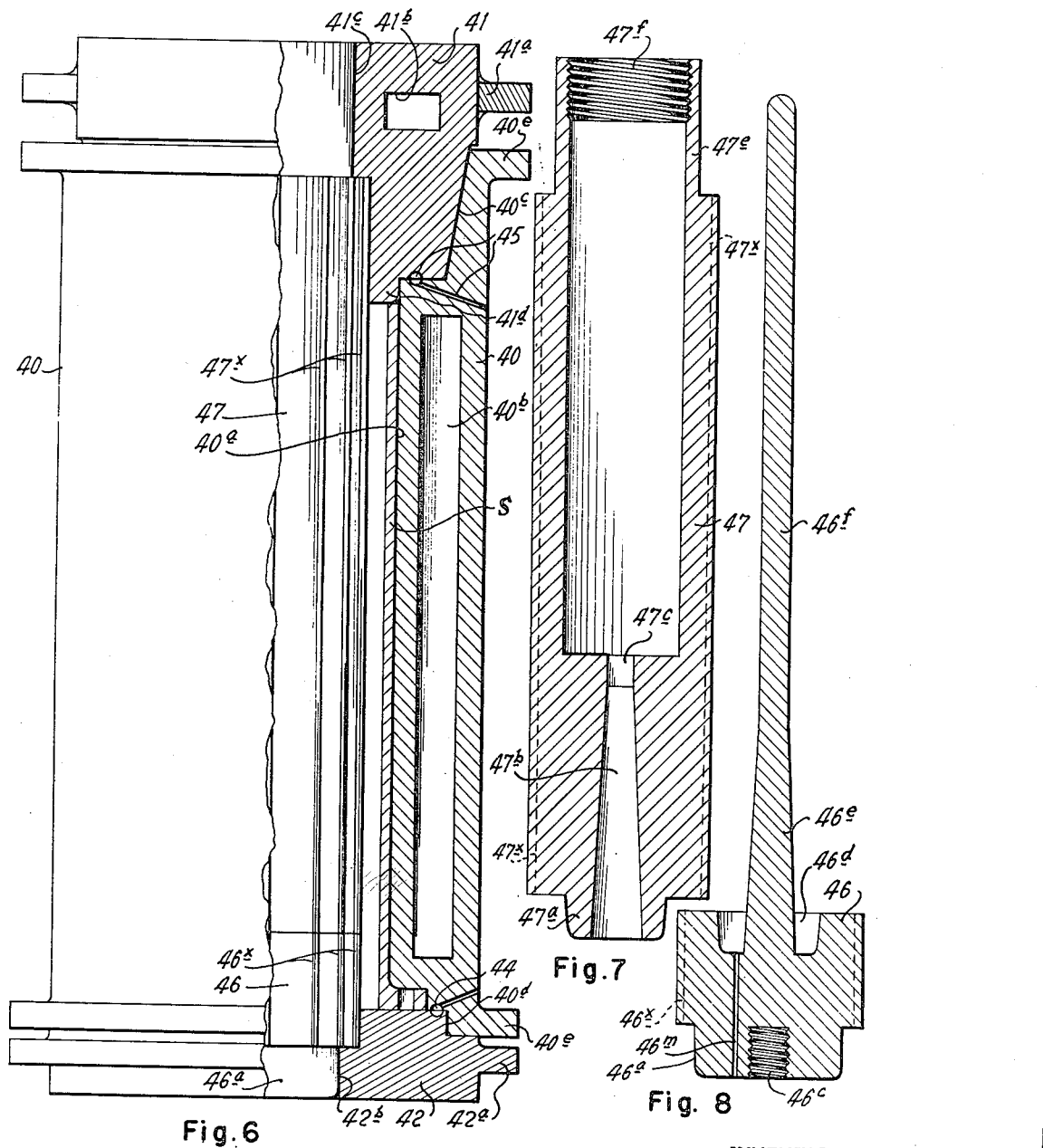

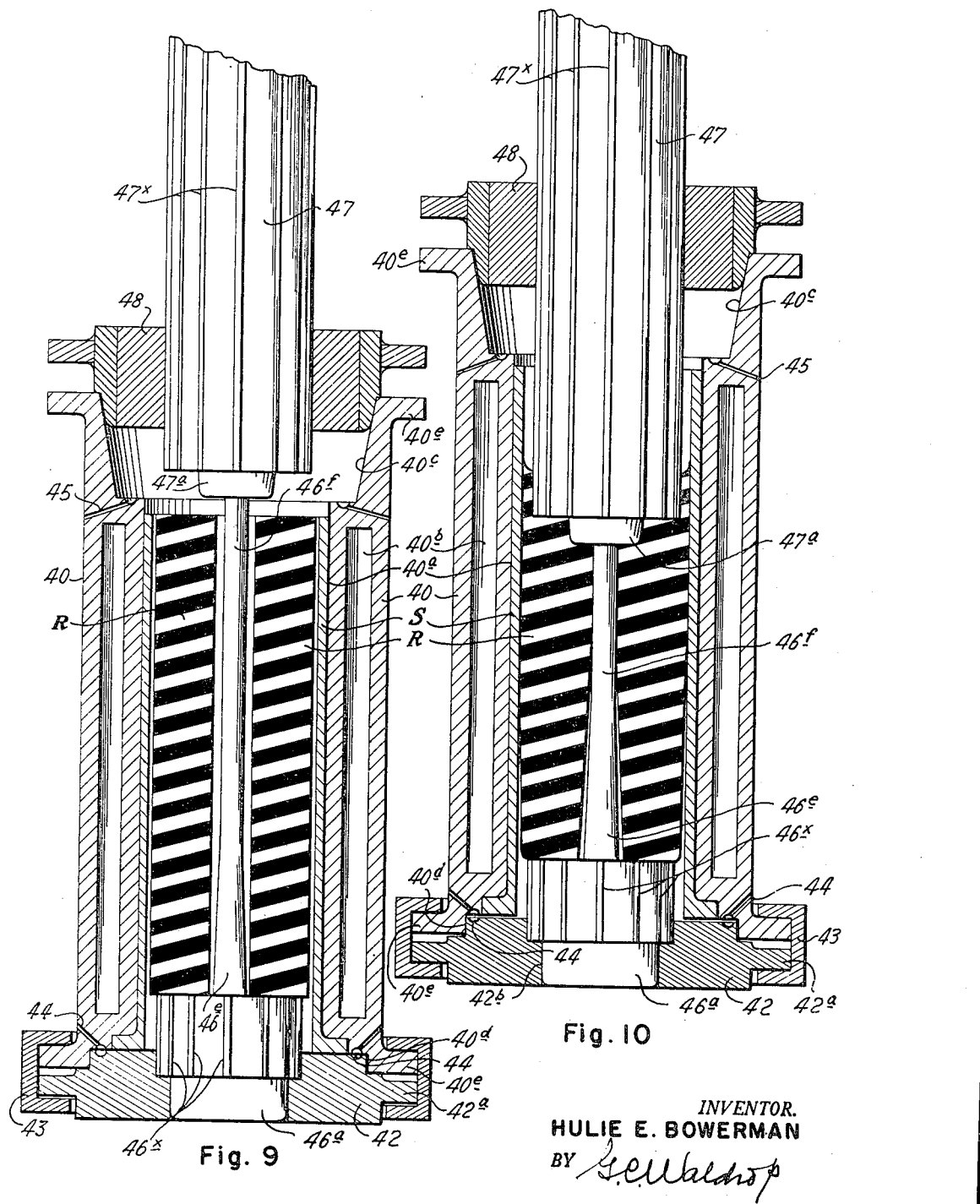

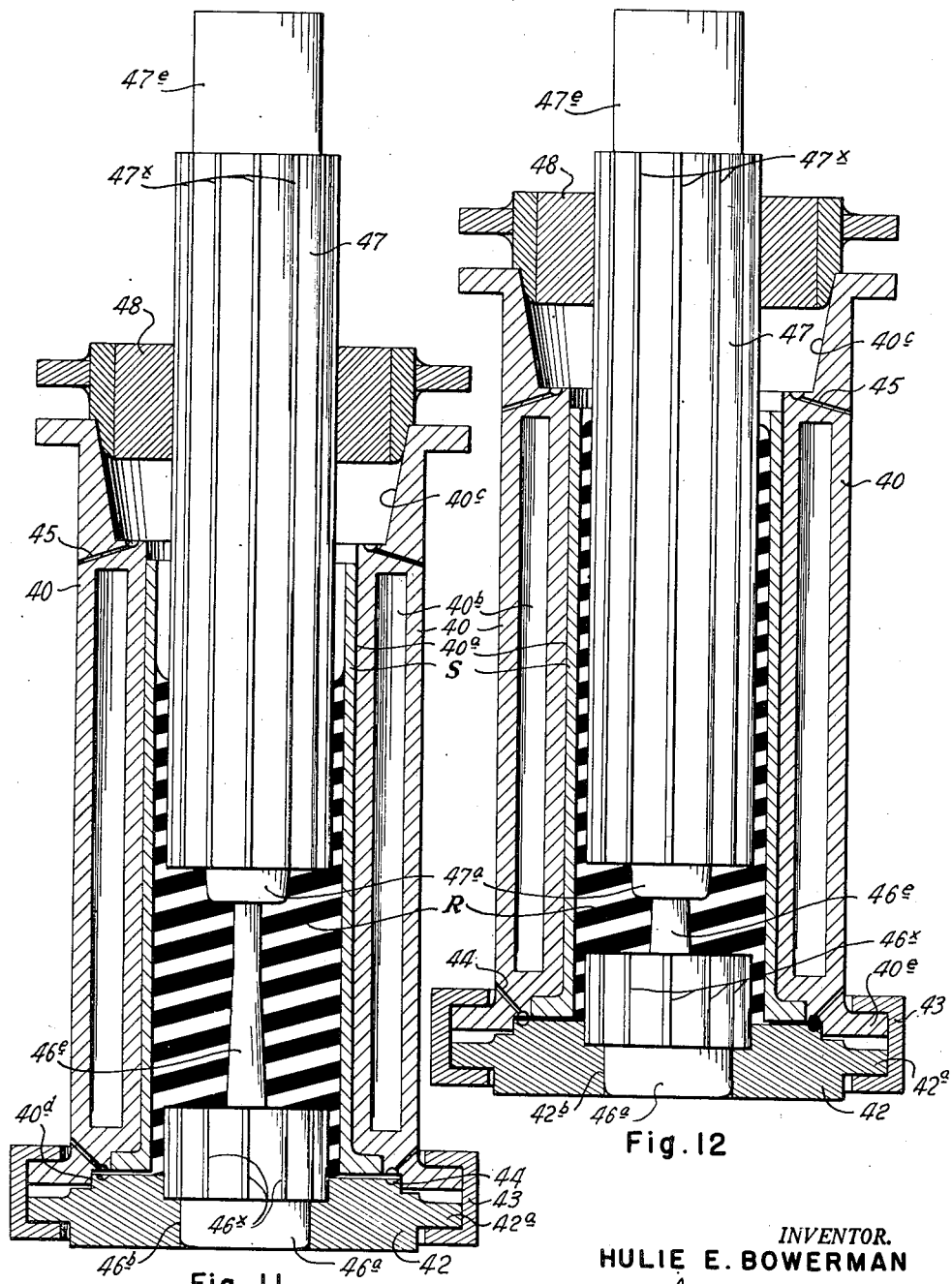

INVENTOR.
HULIE E. BOWERMAN
BY *LCWaldrop*
ATTORNEY

INVENTOR.
HULIE E. BOWERMAN

INVENTOR.
HULIE E. BOWERMAN

United States Patent Office 2,770,012
Patented Nov. 13, 1956

2,770,012

APPARATUS FOR AND METHOD OF MOLDING RUBBER ARTICLES

Hulie E. Bowerman, Grand Prairie, Tex.

Application January 5, 1953, Serial No. 329,660

11 Claims. (Cl. 18—36)

This invention relates to an apparatus for and a method of manufacturing rubber articles of great density such as oil well packers, pipe protectors, rubber bearings, etc. These articles are made of synthetic or natural rubbers or compounds or combinations thereof in accordance with the type of service to which they are to be put. Generally the articles are round on their outer surfaces, and may vary in diameter at desired points along their respective lengths outside as well as inside, in accordance with my invention. Those skilled in the art will readily appreciate the varied shapes and forms of the finished article which may be manufactured without departing from the scope and spirit of my invention.

It is well known that high molding pressures result in high-density molded rubber articles. My invention produces these rubber articles particularly free of voids or entrapped air pockets.

When packers and pipe protectors having voids or pores in their bodies, such as result from so-called laminated construction and wrapped-molding, are put into service in wells of great depth they are frequently subjected to pressures of many thousands of pounds per square inch while submerged in gas, oil, mud or water which fluids are often at very high temperatures. These fluids of course are driven by the high pressures into any existing void in the rubber articles since the articles are immersed therein for hours or even days at a time—or even many months in the case of some packers. Then when these articles have completed a service cycle and removal from the well is undertaken, and the rubber begins to emerge from the high pressure of the well, the pent up fluids in the voids referred to above begin to gasify or turn to steam. The pressure outside the rubber is then greatly reduced upon its withdrawal upwardly, and as the rubber is brought upwardly in the well it swells or expands and hangs up in the well or tears loose from the tools. Fishing these lost rubber elements from the well may be very expensive. It also is known that at times these rubbers explode upon being removed from the well—occasionally an hour or more after removal—and workmen are injured or killed thereby.

High density rubbers produced in accordance with my invention are not subject to these voids and attendant defects and hazards, primarily for the reason that they are molded of solid (as opposed to laminated or built up) load pieces and at pressures far in excess of those to which they are subjected in service.

Therefore the principal object of my invention is to provide a method of an apparatus for molding and curing rubber products at pressures much higher than those which they will encounter during their normal use.

Another object of my invention is to provide a method and apparatus whereby all air is eliminated from within the mold as the latter is closed to ensure that the finished rubber product will be a homogeneous product entirely free of pores and voids.

Another principal object of my invention is to provide a method and apparatus for molding rubber bearings under great pressure and simultaneously bonding said bearings to supporting sleeves, the latter being inserted in the mold prior to introducing the charge of rubber therein.

An important object of my invention is to provide a mold which will shape the internal bearing surface while bonding the outer surface of the rubber to the supporting sleeve.

Still another object of my invention is to provide an apparatus wherein, at the final stages of closing of the mold, the rubber charge therein is pressurized simultaneously at both ends by the injection, in effect, of rubber into both ends of the mold. Enormous mold pressure is provided by a novel engaging action of the parts of the mold as it closes, such action providing a considerable mechanical advantage in the pressurizing of the charge.

A further object of my invention is to provide a mold having jacketed walls to retain and circulate a heated fluid whereby the rubber element may be cured while it is still in the mold under full pressure.

Other objects and advantages of my invention will become apparent during the following discussion of the drawings wherein:

Fig. 1 is an elevation, partly in section, of a mold assembly for molding a packer.

Fig. 2 is a longitudinal section through the major mandrel portion of the mold.

Fig. 3 is a longitudinal section through the minor mandrel portion of the mold.

Fig. 4 is a longitudinal section through the mold showing the mold about to close in preparation for molding a packer.

Fig. 5 is a longitudinal section of a mold modification wherein the mandrel diameters have a reduction to mold a restriction in the bore of the packer.

Fig. 6 is an elevation, partly in section, of a modified mold assembly for molding a rubber bearing, the bearing supporting sleeve being shown in place in the mold.

Fig. 7 is a longitudinal section through the major mandrel portion of the bearing mold.

Fig. 8 is a longitudinal section through the minor mandrel portion of the bearing mold.

Fig. 9 is a mold assembly partly in section showing a rubber blank in place ready to be formed by the mold into a bearing and simultaneously bonded to the bearing sleeve.

Figs. 10, 11, 12 and 13 are successive views of various stages of shaping the rubber charge according to the process of molding bearings.

Fig. 16 is a sectional view showing a modified form of the upper mold head.

Figure 15:
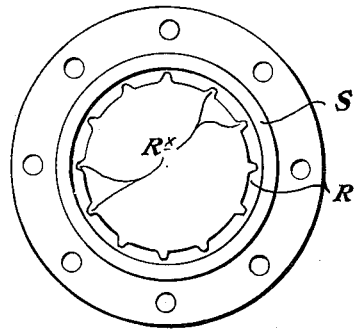
Fig. 15 is a plan view of the bearing shown in Fig. 14.

Referring now to Figs. 1, 2, 3 and 4, like reference characters denote similar parts wherein, 20 designates the barrel or outer portion of the mold having an inner wall 20a and having an annular cavity 20b formed by any convenient method such as welding or otherwise fabricating, one form of which is illustrated in Fig. 1 as 20f. Cavity 20b is to receive circulating steam as through threaded openings 20g for carrying out the curing of the rubber charge employed in the process. The barrel has at each end annular enlargements of the inner diameter, the upper annular enlargement 20c receiving the upper mold head 21, and the lower annular enlargement 20d receiving the lower mold head 22. The mold barrel 20 is provided with flanges 20e at both ends to receive annular channel clamps 23 which engage the flange 20e and the flange 22a on the lower head 22, or the flange 21a on the upper head 21, to hold the respective heads in place while the mold is being closed on the load and before final closure in the press and curing of the product. The heads may also include cavities such as the one shown at 21b for the same purpose as cavity 20b, and may be formed as indicated at 21e, Fig. 1. Air escape ducts 24 are provided in the lower end of the mold between the barrel 20 and the lower head 22 to permit expulsion of trapped air as hereinafter discussed, and other similar ducts 25 are provided at the upper head 21, these ducts also permitting overflow of the material being molded if the quantity of material is excessive.

The lower head 22 has a socket 22b adapted to receive the lower end 26a of the minor mandrel or stinger 26. The minor mandrel 26 may be provided with a threaded bore 26c for the purpose hereinafter discussed. The minor mandrel 26 has a socket 26d, a conical portion 26e, and a long cylindrical spindle 26f thereabove. These elements cooperate with complementary elements of the major mandrel 27, having at its lower end a portion 27a adapted to be received in the socket 26d, and having an internal conical bore 27b adapted to mate with the conical portion 26e of the spindle, and having a short cylindrical bore 27c adapted to provide a snug sliding fit on the spindle portion 26f. The bore 27d is enlarged so that it will not tend to become stuck to the spindle 26f by the mold charging material. In addition, the large bore permits the easy insertion of a cleaning implement to remove any excess material which may be extruded past the bore 27c as the mold is closed. A duct 26m is provided in the minor mandrel which duct serves the same purpose as the ducts 24 and 25.

The upper end of the major mandrel is provided with a reduced outside diameter portion 27e adapted to engage a similarly shaped socket 21c in the upper head 21. The major mandrel is provided at its top with a threaded bore 27f for the purpose hereinafter discussed.

Figure 13:
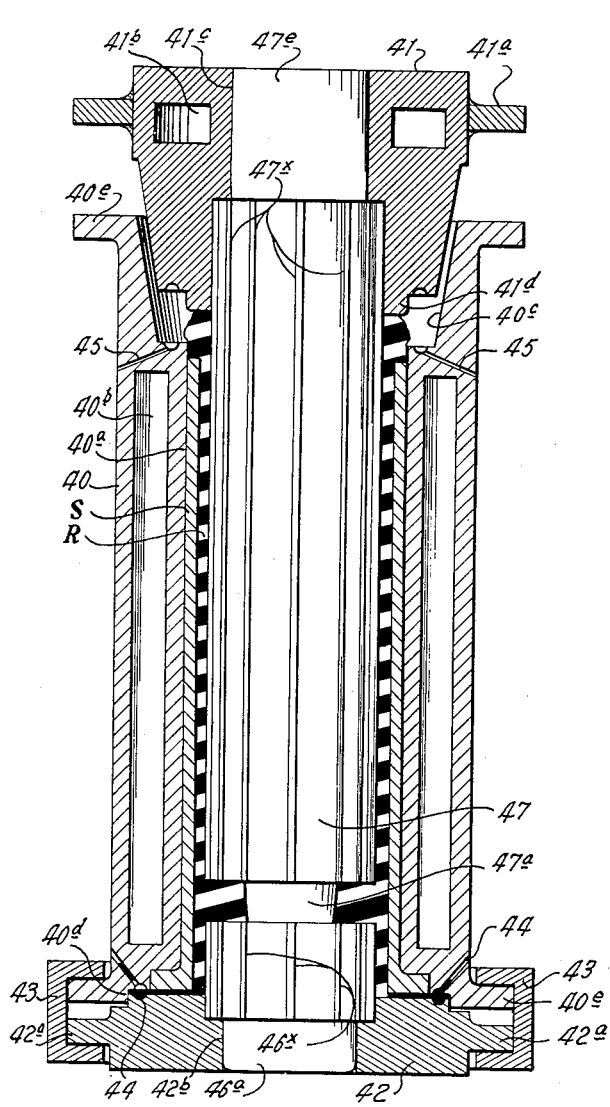
Figure 14:
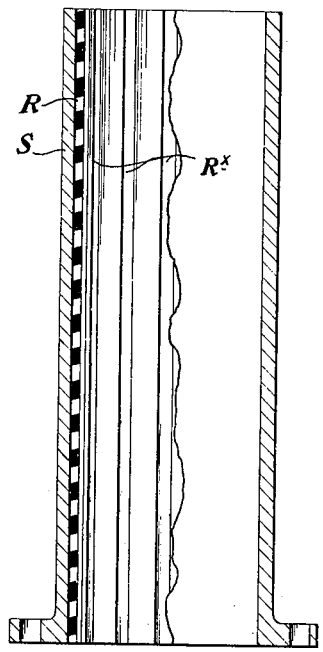
Fig. 14 is an elevation, partly in section, of the rubber bearing as molded by the process illustrated in Figs. 9 through 13.

The mold shown in Figs. 6 through 13 is similar to that shown in Figs. 1 through 4 except for certain modifications made for the purpose of molding rubber bearings of the type shown in Figs. 14 and 15. Referring to Figs. 6, 7 and 8, 40 designates the barrel or outer portion of the mold having an inner wall 40a and having an annular cavity 40b for the purpose hereinafter set forth. The barrel has at each end annular enlargements of the inner diameter, the upper annular enlargement 40c receiving the upper mold head 41, and the lower annular enlargement 40d receiving the lower mold head 42. The mold barrel 40 is provided with flanges 40e at both ends to receive annular channel clamps 43 which engage the flange 40e and the flange 42a on the lower head 42, or flange 41a on the upper head 41, to hold the respective heads in place. The heads may also include cavities such as the one shown at 41b for the same purpose as cavity 40b, discussed later. Air escape ducts 44 are provided in the lower end of the mold between the barrel 40 and the lower head 42 to permit expulsion of trapped air as hereinafter discussed, and other similar ducts 45 are provided at the upper head 41, these ducts also permitting overflow of the material being molded if the quantity of material is excessive.

The lower head 42 has a socket 42b adapted to receive the lower end 46a of the minor mandrel or stinger 46. The minor mandrel 46 may be provided with a treaded bore 46c for the purpose hereinafter discussed. The minor mandrel 46 has a socket 46d, a conical portion 46e, and a long cylindrical spindle 46f thereabove. These elements cooperate with complementary elements of the major mandrel 47, having at its lower end a portion 47a adapted to be received in the socket 46d, and having an internal conical bore 47b adapted to mate with the conical portion 46e of the spindle, and having a short cylindrical bore 47c adapted to provide a snug sliding fit on the spindle portion 46f. The bore 47d is enlarged so that it will not tend to become stuck to the spindle 46f by the mold charging material. In addition, the large bore permits the easy insertion of a cleaning implement to remove any excess material which may be extruded past the bore 47c as the mold is closed. A duct 46m is provided in the minor mandrel which duct serves the same purpose as the ducts 44 and 45.

The upper end of the major mandrel is provided with a reduced outside diameter portion 47e adapted to engage a similarly shaped socket 41c in the upper head 41. A guide 48 is provided, Figs. 9 through 12, to help start the major mandrel into engagement with the rubber blank R, and this guide is replaced by the upper head 41 as the mold elements are moved towards the point of closure. The major mandrel is provided at its top with a threaded bore 47f for the purpose hereinafter discussed.

The molding operation is as follows:

The bearing sleeve S is first fitted upwardly into the barrel 40, and the latter is then seated on head 42, the stinger 46 being fitted into the head so that its spindle 46f projects upward into the mold cavity. Next a blank of uncured rubber R having a hole or opening axially therethrough is passed over the stinger 46 into the mold cavity 40a within the sleeve S. The guide member 48 is then seated into the enlarged end 40c of the mold as in Figs. 9 to 12 and mandrel 47 is passed through an opening provided for the purpose in guide 48 (or through head 41 when guide 48 is omitted), the mandrel 47 passing downwardly over stinger 46f, as in Fig. 10, and against rubber blank R. The minor mandrel 46 also acts as a pilot or guide within major mandrel 47 as the two progress toward a final mating closure. Next a hydraulic press or other power means (not shown) is brought into operation to project mandrel 47 down into the rubber blank over stinger 46, as in Figs. 10, 11 and 12. It is to be noted that due to the bearing sleeve S being of greater inside diameter than the outside diameter of the mandrel 47 the rubber lags against the inner wall of the sleeve as the mandrel progresses inwardly to close against the enlarged section 46e of the stinger as shown in Figs. 10 and 11, which lag causes a squeezing action serving to expel the entrapped air out through ducts 44, 45, and 46m and between mold 40, head 41 and stinger 46. All of the entrapped air will escape provided that the mandrel is driven into the blank slowly so as to give the air time to escape as the rubber flows upwardly along the mold wall in an orderly fashion. In addition, since mandrel 47 is hollow and open at both ends air may also escape therethrough. As the blank is compressed and driven to the lower end of the mold filling that end as shown in Fig. 11, and as mandrel 47 is further pressed into and through the blank as shown in Fig. 12, the rubber of the blank is displaced upwardly by mandrel 47 to completely fill the mold and expel the entrapped air at the upper end. The blank is of sufficient volume to be displaced by mandrel 47 into the approximate condition shown in Fig. 13 before the mandrel and stinger finally close together. The guide 48, when used, is now replaced by the head 41 and the parts of the mold are closed by the application of suitable force to the heads, which force drives the mandrel finally into the rubber as it mates in closing with stinger 46, while the head 41 progressively closes with the mold barrel at 40c and confines the rubber under the pressures desired. The mold is then heated, as by suitably introducing steam into cavities 40b and 41b by conventional connections as shown only in Fig. 1, to cure the rubber.

In order to provide a maximum pressurizing of the rubber R and at the same time accomplish said pressurizing with the exertion of minimum amounts of longitudinal force on the mold, the tapering mating portions of the mandrels cause tremendous internal pressures to be generated in the mold at the time of closure which has a simular effect as would be injection of additional charge of rubber into the mold at the final stage of closing thereof, Fig. 13. The snug-fitting bore 47c prevents any appreciable quantity of rubber from passing upwardly therebeyond. Thus, the rubber is forced downwardly to fill the annular socket 46d, and, as the mandrels mate, the conical surfaces 46e and 47b come together to squeeze the rubber out through the portions 46d and 47a. At the same time, the member 41d enters the top of the bore 40a of the barrel 40, having the same effect as injecting more rubber into the upper portion of the mold. In effect, rubber is simultaneously injected into the mold at both ends of the blank at the moment of closing, which causes a tremendous pressure rise in the blank and ensures that all of the rubber will be pressurized. The primary purpose of the dual mandrel structure is to pressurize the blank, although when the mandrels are mated, they determine the inside diameter and shape of the finished product. As shown in Figs. 6 through 13, both mandrels are provided with outstanding axially disposed ribs 46x and 47x which serve to mold the ridges Rx along the inner surface of the bearing, Figs. 14 and 15.

In the several figures it will be noted that the head 41 has an annular projection 41d which enters into the bore of the barrel 40 when the mold parts are fully closed. This construction permits the mold parts to move away from closure under stresses caused by the "curing" reactions to permit excesses of rubber to escape through the opening between the head and barrel into ducts 45 and out therethrough without uncovering the barrel. As soon as the "curing" stresses are thus relieved the continuous pressure applied to the head 41 again completely seats it on the mold barrel 40, thus eliminating "chewing" actions which otherwise produce ragged defects at the flash lines on the finished molded product.

Figure 17:
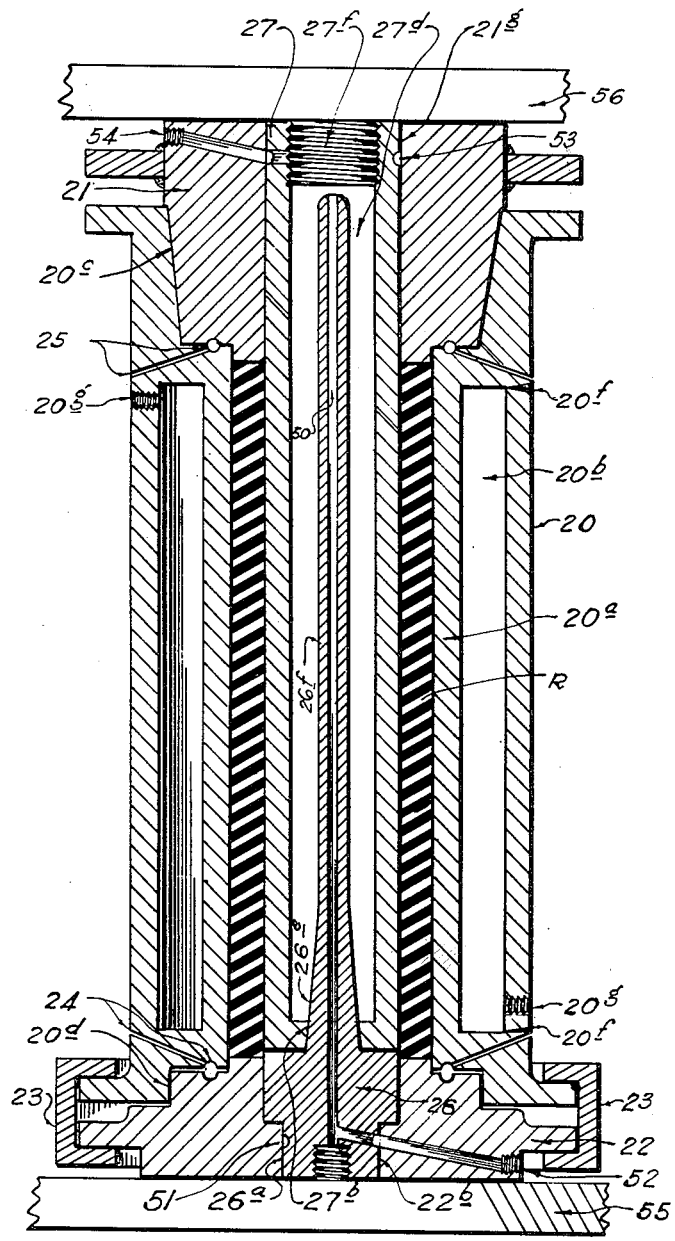
Figs. 17 and 18 are longitudinal sections of modified mold assemblies wherein the heated curing medium is circulated through both the mandrels and the jacked mold whereby curing of the rubber product is effected simultaneously both inside and out.
Figure 18:
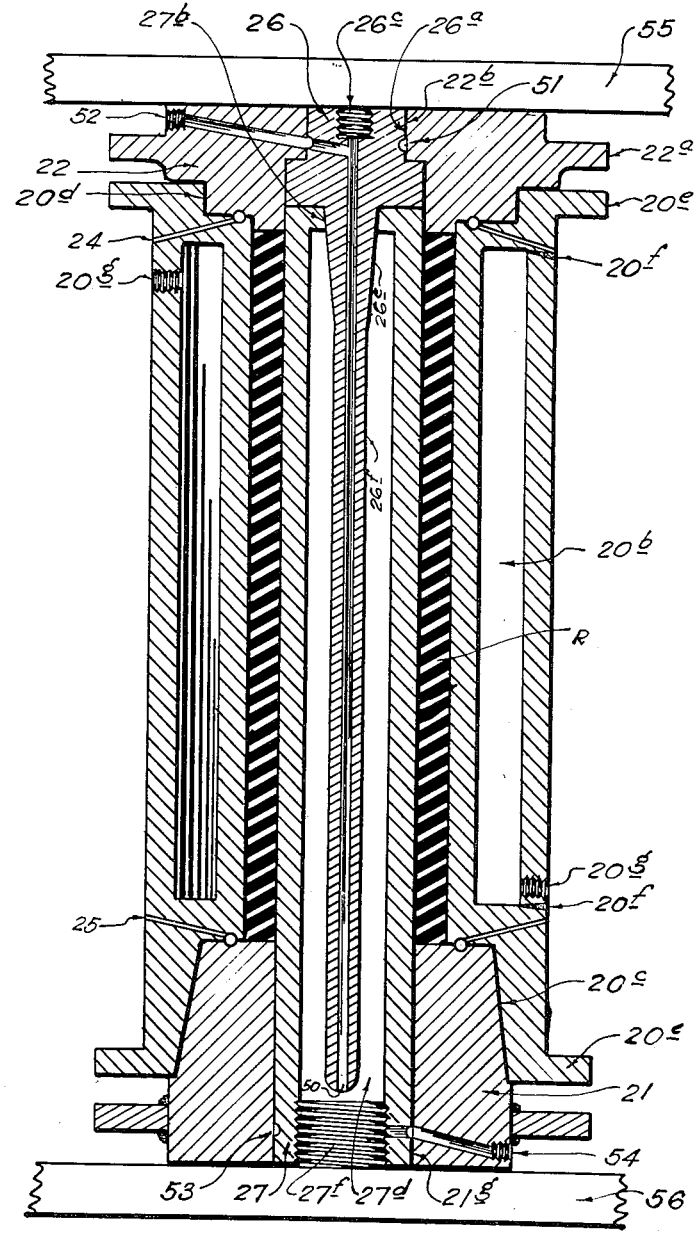

While I can attain any reasonable pressure desired on the rubber as set forth above, I also have, in other forms of apparatus, one form of which is shown in Figs. 17 and 18, dispensed with guide 48 by the simple expedient of providing a suitable opening for mandrel 47 to pass through head 41, and with the mold otherwise properly closed, I drive the mandrel 47 through the blank thereby exerting any desired pressure upon the rubber in the mold.

The molding of a packer element is accomplished in the same way as set forth above with respect to the molding of a bearing except that the mold shown in Figs. 1 through 4 is used and the metal sleeve S is omitted.

The heads 21 and 22 have annular projections 21d and 22c which serve the same purpose as the projection 41d set forth above. Moreover, when it is desired to mold a packer element having a metal ferrule 30, Fig. 5, at one or both ends, the heads of the mold may be provided with annular recesses 22d and 21e as shown in Figs. 1 and 5 wherein the outer end of the ferrule 30 may be concentrically retained while the inner end of the ferrule is being bonded into the rubber.

It will be observed in Fig. 5 that by providing a reduced outer portion of either mandrel as at 27y or 26y or both, a corresponding reduction in the inside diameter of the rubber article results. The inner portion of the major mandrel still mates with the minor mandrel in the same way, however.

As a further modification of my method and apparatus, as shown for instance in Fig. 16, the head 21 may be provided with a bore 21g of the same diameter as the full core diameter of the major mandrel 27 so as to permit the head 21 to be seated in the upper annular enlargement 20c of the barrel 20 before insertion of the major mandrel 27 into the mold. In this modification, the blank R would first be inserted in the mold; the head 21 would then be secured in the enlargement 20c as by clamps 23; and the blank would then be formed and pressurized within the barrel 20a by the driving of the major mandrel 27 through the bore 21g of the seated head 21 and into the blank R to a final mating engagement with the minor mandrel 26. This same modification may be made in the method and apparatus for molding the rubber bearing.

While I have shown mandrels extending through the head or through guide 48 in molding a rubber article, obviously a wide range of choice in detail will readily occur to those skilled in the art since the mold may be pressurized by forcing the major mandrel through the rubber load and over the minor mandrel either simultaneously with or just after the closing of the mold, either method applying high pressure to compress the rubber load, the resultant article then being heat cured.

In the modified form shown in Figs. 17 and 18 the stinger 26 has an axial opening 50 through its entire length, a groove 51 about its base communicating with threaded opening 52 and axial opening 50, while major mandrel 27 has a similar groove 53 communicating with threaded opening 54 and the interior of mandrel 27. These grooves 51 and 53 provide for the passage of the heated curing medium through openings 52 and 54 without requiring rotative registration of the mandrel sections with the respective mold heads 22 and 21.

As shown in Fig. 17 the assembled mold is closed about the rubber load R between press heads 55 and 56. In Fig. 18 the mold assembly has been reverse ended and sufficient additional pressure applied to further close the assembly about load R and permit removal of clamps 23. While pressure is maintained on the ends of the assembly through press heads 55 and 56 which fit neatly against mold heads 21 and 22 the heated curing medium (such as steam) is circulated through 20b by means of threaded openings 20g and simultaneously through the mandrel assembly by introduction into threaded opening 52, thence through groove 51 axial opening 50 through the stinger and outwardly through groove 53 and opening 54. The dry steam will fill the entire cavity between the stinger and the mandrel 27 while the condensate readily passes downward and out through opening 54. By thus heating the mold both outside and the mandrel assembly inside of the load R the curing time is reduced approximately fifty percent and a much superior product results from a more uniform cure than is obtained when the heat is applied to one side only of the product for such duration of time to effect curing throughout the product.

It will be readily understood by those skilled in the art that mold and mandrel details may readily be varied to effect the heating of the entire length of R and the heating medium may be introduced into the assembly passages selectively to control the cure as desired. Also while I have shown press heads 55 and 56 as closing the openings in the mandrels, plugs could readily be inserted into threaded openings 26c and 27f.

I claim:

1. A method for high-pressure molding of products from rubberlike material comprising the following steps: forming a blank of uncured material having a bore therethrough; placing the blank in a mold having the shape desired for the outer portion of the finished product; expanding the blank from within its bore to cause the blank to fill the mold and to expel any entrapped air; closing the mold while at the same time ejecting therefrom any excess material; subsequently highly pressurizing the material in the mold by end-compressing the material at one end of the mold while simultaneously decreasing the material receiving volume of the mold from within said bore near the other end of the mold; and curing the material while so pressurized.

2. The method set forth in claim 1 wherein a sleeve is inserted in said mold, and the blank is molded within the sleeve and bonded therewithin.

3. A high-pressure mold for molding a substantially tubular product from an uncured blank of rubber-like material comprising a barrel adapted to shape the outer portion of the product; a short mandrel and a long mandrel to form when mated a core in the mold; a pair of heads to close said barrel, a first head supporting the short mandrel and being initially fixed to one end of said barrel, and a second head supporting the long mandrel and adapted to be forced into the other end of the barrel, said mandrels having complementary end surfaces mating near said first head when the mold is fully closed; and an annular projection in said second head and shaped to slide inside said barrel, said projection entering into the barrel before the mating of said end surfaces to close the barrel after expulsion of excess material and of air, whereby upon further closing of the mold said projection will end-pressurize the material in the vicinity of said second head and said complementary surfaces will mate to force the material therebetween into the barrel portion and thereby simultaneously pressurize the material in the mold in the vicinity of said first head.

4. A mold as set forth in claim 3, wherein one mandrel has a spindle extending axially outwardly from its surface and the other mandrel has a spindle-diameter bore axially extending thereinto, said spindle being small in diameter in comparison with said mandrels and serving to align the latter as they approach a mated condition.

5. A mold set as set forth in claim 4, wherein said spindle-diameter bore is short in length and communicates with a larger diameter bore extending inwardly into said mandrel therebeyond.

6. A mold as set forth in claim 3, wherein said complementary surfaces comprise a cup-shaped recess in one mandrel and a complementary enlargement on the end of the other mandrel.

7. A mold as set forth in claim 3, wherein said barrel has an annular recess adjacent said first head whereby a sleeve having a flange extending outwardly around one end may be inserted in the barrel with said flange occupying said recess, the material filling said sleeve and being bonded thereto during molding.

8. In a mold as set forth in claim 3, small ducts in each end of the mold adjacent the heads, and small ducts in at least one mandrel and extending through a complementary surface to permit escape of entrapped air as the mold is closed.

9. In a mold as set forth in claim 3, said mandrels having aligned outstanding ribs on their outer surfaces to form recesses in the inner periphery of the tubular product during molding thereof.

10. In a mold as set forth in claim 3, annular recesses in the heads adjacent the mandrels and coaxial therewith to receive and orient reinforcing ferrules to be bonded into the rubber.

11. In a mold as set forth in claim 3, the outer surfaces of said mandrels adjacent said complementary surfaces being annularly reduced to mold a product having a diametrically restricted portion in its inner periphery.

References Cited in the file of this patent

UNITED STATES PATENTS

| | | |
|---|---|---|
| 683,979 | Petit | Oct. 8, 1901 |
| 717,604 | Oelkers | Jan. 6, 1903 |
| 1,541,357 | Johnson | June 9, 1925 |
| 1,658,564 | MacDonald | Feb. 7, 1928 |
| 1,997,908 | Lord | Apr. 16, 1935 |
| 2,092,027 | Schwartzwalder | Sept. 7, 1937 |
| 2,135,803 | Dumert | Nov. 8, 1938 |
| 2,531,329 | Gerstenmaier | June 13, 1944 |